(12) United States Patent
Neaux

(10) Patent No.: US 7,086,682 B2
(45) Date of Patent: Aug. 8, 2006

(54) DEVICE FOR OBTURATION OF AN APERTURE FOR AN AUTOMOTIVE VEHICLE

(75) Inventor: Jean-Claude Neaux, Terves (FR)

(73) Assignee: Wagon SAS, Bressuire (FR)

( * ) Notice: Subject to any disclaimer, the term of this patent is extended or adjusted under 35 U.S.C. 154(b) by 62 days.

(21) Appl. No.: 11/004,582

(22) Filed: Dec. 3, 2004

(65) Prior Publication Data
US 2005/0121943 A1  Jun. 9, 2005

(30) Foreign Application Priority Data
Dec. 5, 2003   (FR) ................................. 03 14326
Dec. 31, 2003  (FR) ................................. 03 15649
Apr. 16, 2004  (FR) ................................. 04 04067

(51) Int. Cl.
*B60J 3/00*  (2006.01)
(52) U.S. Cl. ................ 296/97.4; 160/107; 296/97.1
(58) Field of Classification Search ............. 269/97.4, 269/97.7, 97.8, 214, 141, 143; 160/107
See application file for complete search history.

(56) References Cited

U.S. PATENT DOCUMENTS

| | | | |
|---|---|---|---|
| 3,389,737 A * | 6/1968 | Arnold et al. | 160/107 |
| 4,913,213 A * | 4/1990 | Schnelker | 160/107 |
| 6,427,394 B1 | 8/2002 | Clodic | |
| 6,523,880 B1 * | 2/2003 | Yako | 296/97.1 |
| 6,736,185 B1 * | 5/2004 | Smith et al. | 160/107 |
| 2004/0011476 A1* | 1/2004 | Schroder et al. | 160/107 |
| 2004/0040672 A1* | 3/2004 | Nagar | 160/98 |
| 2005/0103449 A1* | 5/2005 | Scharff et al. | 160/107 |
| 2005/0284584 A1* | 12/2005 | Schroder et al. | 160/107 |

FOREIGN PATENT DOCUMENTS

| | | | |
|---|---|---|---|
| EP | 134728 | * | 3/1985 |
| FR | 2782810 | | 3/2000 |
| JP | 2003074265 A | * | 3/2003 |

* cited by examiner

*Primary Examiner*—K. B. Patel
(74) *Attorney, Agent, or Firm*—Shewchuk IP Services, LLC; Jeffrey D. Shewchuk

(57) ABSTRACT

An embodiment of the invention concerns an obturating device for a vehicle, comprising two panels superposed and united to one another, defining an at least partially closed internal space, and movable occulting means which may extend in the said closed space.

24 Claims, 3 Drawing Sheets

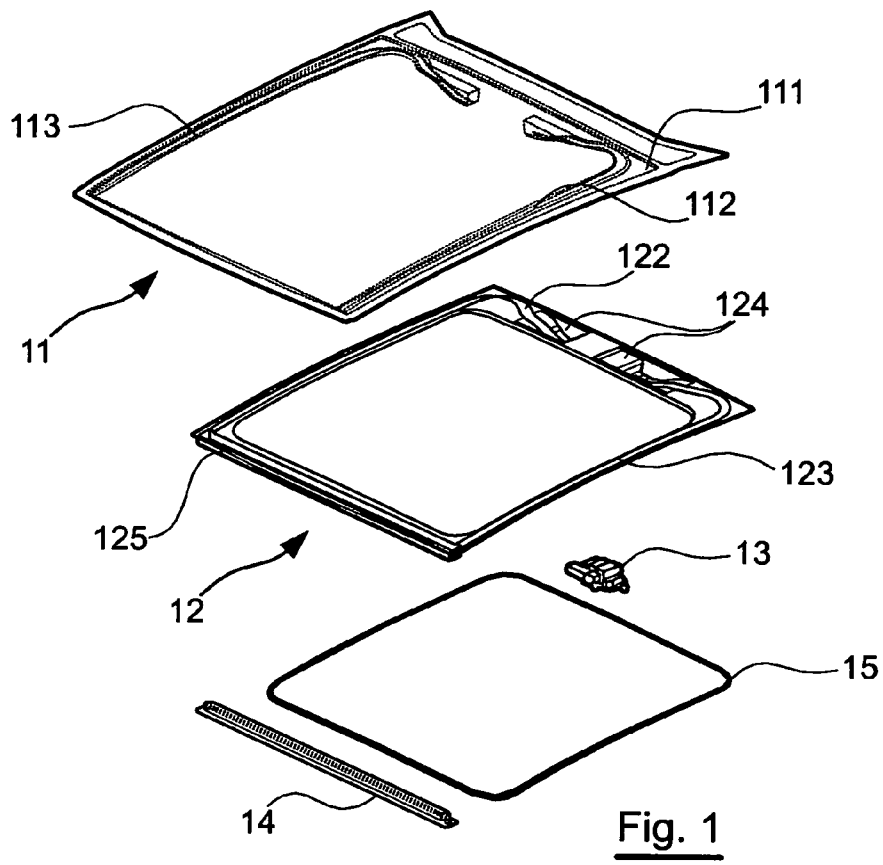
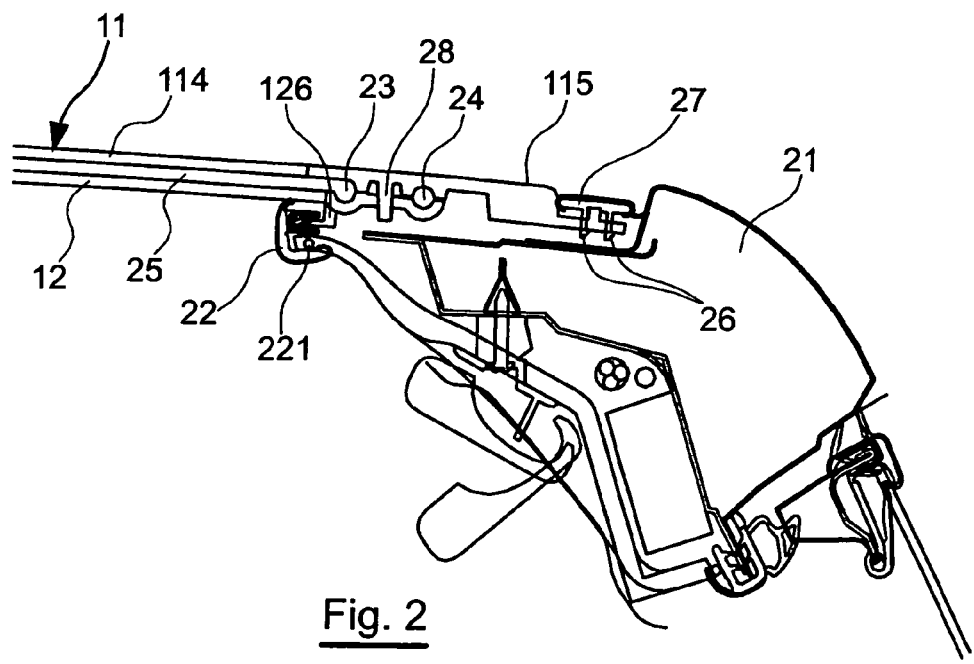

DEVICE FOR OBTURATION OF AN APERTURE FOR AN AUTOMOTIVE VEHICLE

CROSS-REFERENCE TO RELATED APPLICATION

The present application claims priority of French Application No. FR 04/04067, filed Apr. 16, 2004, French Application No. FR 04/00014, filed Dec. 31, 2003, and French Application No. FR 03/14326, filed Dec. 5, 2003, not in English.

FIELD OF THE INVENTION

The field of the invention is that of automobiles, and more particularly, of glass surfaces, particularly of large dimensions, for automobile vehicles. The invention therefore concerns obturating devices for an aperture formed in a vehicle, their production and their mounting.

BACKGROUND OF THE INVENTION

Such an opening can in particular be formed in the region of the roof of the vehicle, the rear window, the side windows, etc. In other words, the invention relates to glass roofs, or more generally transparent or translucent roofs, rear quarter panel windows, windows of rear or side doors, windshields, hatchbacks, and if need be, their combination.

The term "aperture" should therefore be interpreted here in a broad sense of a position provided on the vehicle for receiving such a device. It likewise encompasses, if need be, the conventionally corresponding surface with plural apertures, and for example the assembly corresponding to a roof and a rear window.

A present tendency of automobile design is to more and more propose glazed surfaces in vehicles, particularly for reasons of comfort, esthetics and ergonomics. Therefore, in particular, a partially or wholly transparent roof may be provided. In certain cases, the windshield and/or the rear quarter panel windows form a transparent prolongation of this roof.

These roofs, as well as the other glazed surfaces, are formed of special glasses. They are often difficult to manufacture, particularly when the surface is large and not plane. This is the case, for example, of numerous glass roofs, which have at least a double curvature, longitudinally and laterally, or variable curvatures.

These glass roofs are moreover very heavy, which has drawn the attention of automobile constructors, who always wish to reduce the total weight of the vehicle and to lower its center of gravity. Furthermore, they are relatively fragile.

Moreover, the mounting of such a roof is not easy, and has to be followed by many operations by the constructor to install all the equipment associated with the roof, for example lighting, a finishing trim, or an occulting blind.

Regarding the latter point, it should be noted that the presence of a blind, or of another type of occulting means, is necessary, because it is essential in certain circumstances to occult at least a portion of the glazed surface, for example for protection from the sun.

Numerous types of roof blind have already been proposed, and are generally complex.

In fact, it is necessary to guide and maintain the blind in a horizontal position, without its buckling (for evident esthetic and ergonomic reasons), and preferably so that it follows the curvature of the roof so as to free the available interior space as far as possible. To obtain this result, the curtain of the blind is generally equipped with stiffeners, which will keep it in the desired position.

The use of such stiffeners makes the construction and use of the blind relatively complex and heavy. Moreover, this approach generates considerable bulk during the folding of the blind (the bulk of the stiffeners is added to that of the cloth), while it is always desired that the space within the vehicle remains as large as possible. This is particularly true for the roof.

SUMMARY OF THE INVENTION

One or more embodiments of the invention have the object of remedying these various disadvantages of the prior art.

More precisely, the object of an embodiment of the invention is to provide a technique of obturation of an aperture (corresponding for example to a roof or a rear window) of a vehicle which is simple and effective to use, both as regards manufacture of the device (for example, at a subcontractor) and as regards its mounting in a vehicle (for example, at a constructor).

Therefore, in particular, an object of an embodiment of the invention is to provide such a technique, enabling the number of operations performed by the constructor during mounting to be considerably simplified, and thus the corresponding production costs to be reduced.

Another object of an embodiment of the invention is also to simplify, at the constructor, the assembly and adjustment of the various equipments associated with the devices.

An embodiment of the invention also has as its object to provide such a technique, which will enable weight and bulk reduction of the obturating devices and of their associated equipments. In particular, an object of the invention is to provide such a technique which maximizes the free space near a roof, even when occulting means are deployed.

According to a particular aspect of an embodiment of the invention, another object is to provide such a technique enabling the use of the occulting means to be simplified, while reducing its weight and bulk, particularly in the folded position.

These objects, and also others which will become more clearly apparent in what follows, are attained according to one or more embodiments of the invention by means of a glazed device for a vehicle, comprising two panels which are superposed and united to each other, defining an at least partially closed interior space, and movable occulting means which may extend in the closed space.

Therefore, according to an embodiment of the invention, this replaces a conventional glazed panel by an assembly of two panels, between which an occulting means can be deployed. An efficient system is thus obtained, in which the occluding means is protected and guided. Furthermore, there is no reduction of the available space when the occulting means is deployed.

According to an advantageous embodiment, the said panels are curved, and impress a corresponding curvature on the occulting means when it is deployed.

It is therefore not necessary according to an embodiment of the invention to provide stiffeners and other independent guide elements for a blind cloth or another flexible element. In fact, the occulting means are simply and directly placed in the desired form by the lower layer on which it is supported.

This approach furthermore enables the weight and bulk of the occulting means to be reduced while obtaining a more effective result in terms of positioning.

Preferably at least one of the said panels integrates at least one technical element effecting or participating in a technical function distinct from the principal function of obturation.

The structure in two panels indeed enables the direct provision of several technical functions on the devices, which is not possible with a conventional glazed panel.

Also, according to an advantageous aspect of an embodiment of the invention, at least one of the said panels comprises means for guiding the said occultation means.

Preferably the device also comprises means for filtering and/or ventilation, intended to filter and/or ventilate the air present in the said closed space.

This particularly permits avoiding condensation within this housing.

The obturation device according to an embodiment of the invention may also advantageously integrate at least one of the technical elements belonging to the group comprising:
means for receiving and/or fixing a sealing element;
means for receiving and/or fixing filtering and/or ventilation means;
means for receiving and/or fixing a roof rack bar, or means cooperating with such a roof rack bar;
joint embellishers;
an adhesion path;
a cable path;
means for receiving and/or fixing a finishing ring;
a finishing ring;
means for receiving and/or fixing lighting means;
means for receiving and/or fixing motorization means for occultation means;
sensors, particularly for rain, temperature and/or sunshine;
means for receiving and/or fixing an antenna and/or a bodywork element;
antennas;
de-icing, heating and/or air conditioning means;
means for receiving a gas or liquid crystals;
means for centering and/or uniting the said panels;
means for acoustic and/or thermal insulation;
means for centering and/or uniting the said device to the said vehicle;
sealing means between the said device and the said vehicle;
means for control and/or command of the elements integrated with the said device;
windshield-wiper means;
illuminating lights;
means for receiving an interior trim of the said vehicle.

It will be understood that one or more embodiments of the invention therefore enable easily realizing pre-equipped devices (the above list of equipments is not limitative) which the constructors wish to place directly on the vehicles.

The device preferably also bears an encapsulated joint, an adhered joint or a sliding joint.

According to an advantageous embodiment, the said panels each define a half-shell, obtained for example by molding, casting, thermoforming, or extrusion.

The technical elements are then advantageously obtained simultaneously with the corresponding panel, by molding, casting, thermoforming or extrusion, so that each panel forms a single piece, integrating the said technical element(s).

According to an advantageous aspect of an embodiment of the invention, at least one of the said panels has an opaque and/or colored zone, intended in particular to conceal one or more of the said technical elements.

According to a particular embodiment of the invention, the device comprises an exterior panel (also termed "design layer" in what follows) and an interior panel (also termed "technical layer" in what follows), the said technical elements being principally associated with the interior panel.

Advantageously, at least one opaque and/or colored zone is formed on the said exterior panel. The interior panel can of course likewise have such zones.

According to a preferred embodiment of the invention, the said panels are made of plastic. This enables the weight of the assembly to be greatly reduced, and the different technical functions to be efficiently obtained, during the manufacture of each panel.

Preferably at least one of the said panels has a coating providing at least one of the protections belonging to the group comprising:
scratchproof and anti-impact protection;
protection against ultraviolet;
protection against ageing;
climatic protections.

The devices according to an embodiment of the invention can particularly be intended for at least one of the elements belonging to the group comprising:
roofs;
rear windows;
side windows;
windshields;
hatchbacks.

According to a particular embodiment of the invention, the obturating device may comprise means permitting a displacement with respect to the chassis of the said vehicle.

This means permitting a displacement may particularly comprise at least one hinge.

This approach can particularly be applied to a vehicle rear window.

According to a particular aspect of an embodiment of the invention, at least two obturating devices may be grouped to form an obturation module. In such a module, the devices are connected to one another by at least one structural element.

Advantageously, at least one of the said structural elements comprises means for connection to the chassis of the said vehicle.

In an embodiment of the invention, a first of the said devices corresponds to a roof and a second of the said devices corresponds to a rear window.

Advantageously, each of the said obturating devices comprises occulting means.

Such a module may also comprise a windshield, for example of glass.

Such a module advantageously comprises an internal trim, at least partially covering a junction zone between the said obturating devices.

The trim preferably covers the mountings of two occulting blinds respectively associated with two of the said obturating devices. The internal trim advantageously integrates at least one supplementary function such as:
internal lighting;
one or more storage units.

One or more embodiments of the invention also concern the process of manufacture of an obturating device or module such as described below. Such a process comprises the following steps:
obtaining two panels;
obtaining movable occulting means;

uniting the occulting means with at least one of the said panels;

superposition and uniting the said panels to form the said obturating device, the said panels defining an at least partially closed space.

The panels are advantageously obtained by molding, casting, thermoforming or extrusion.

Preferably, the said step of obtaining comprises the integration of at least one technical element performing or participating in a technical function distinct from the principal function of obturation.

In particular, the technical element(s) may comprise filtering and/or ventilating means.

Advantageously, the said process of manufacture comprises a step of pre-assembly of at least one of the said technical elements to at least one of the said panels, before the said step of superposition and uniting.

The said uniting may for example be effected by snapping, riveting, welding, screwing, or adhesion.

Then according to an embodiment of the invention, the said obturating device may be placed on the said vehicle and united therewith in the form of a single pre-equipped part.

There is thus only a single, very simple, operation to be performed at the constructor.

Preferably, the union with the vehicle is sealed, by means of adhesive and/or of at least one sealed joint united with the said obturating device.

This uniting with the vehicle may particularly be performed by screwing, adhesion, and/or welding.

An embodiment of the invention also concerns automobile vehicles comprising at least one device or module as described above.

Other characteristics and advantages of embodiments of the invention will become apparent on reading the following description of a preferred embodiment of the invention, given simply as an illustrative example and without limitation, and the accompanying drawings.

BRIEF DESCRIPTION OF THE DRAWINGS

FIG. 1 shows an exploded diagram of an obturating device according to a particular embodiment of the invention.

FIG. 2 shows a partial view of the assembled device of FIG. 1, in lateral section, mounted on an automobile vehicle.

DETAILED DESCRIPTION OF ILLUSTRATIVE EMBODIMENTS

Figure 3:
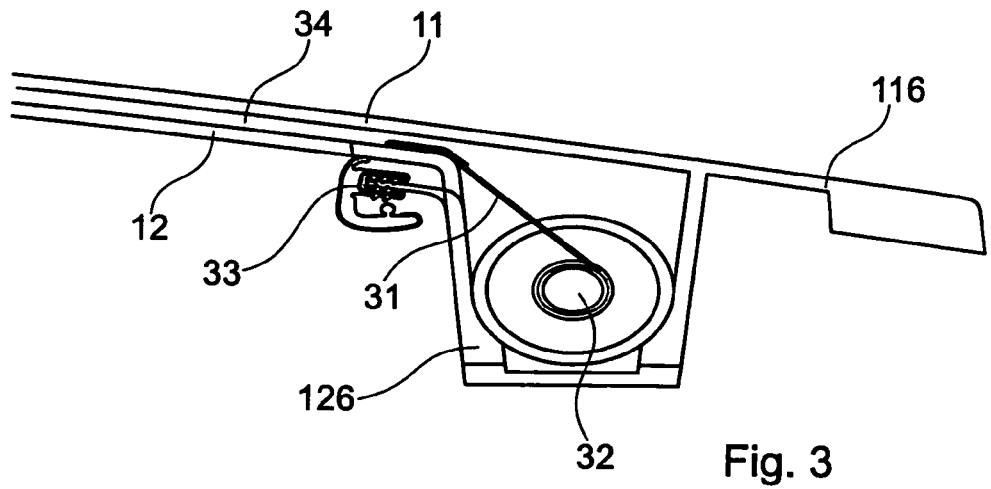
FIG. 3 shows, in section, a first embodiment of a roller blind on a device according to the invention.

One or more embodiments of the invention therefore concern a new approach to obturating devices (such as glazed roofs, side, rear, or front windows, of a vehicle) intended for automobile vehicles. The embodiment described below concerns a glazed roof. It is clear that the same approach may be used for other windows in the vehicle.

As already explained, in the known devices, and particularly glazed roofs, occulting means are generally provided, conventionally in the form of one or more roller blinds, the actuation of which may be manual or motorized. Roofs of known types are realized in glass, and the blinds are deployed within the vehicle, along the roof. They may be equipped with stiffeners to more closely follow the shape of the roof.

The new and inventive approach of an embodiment of the invention rests particularly on the use of two panels, or two layers, to form the roof or another window. The blind, or more generally the occulting means, is mounted so that it extends between the two layers, in a space provided for this purpose. It is therefore easy to guide and conform the blind without the necessity of providing stiffeners nor of fitted guide rails. Furthermore, the blind does not extend within the vehicle, and so does not reduce the interior space.

The invention is not limited to the case where a single occulting means is used. For a roof, two parallel occulting means may thus be provided, for the right and left sides of the vehicle (as will be seen hereinafter, forming suitable guiding means is easy).

Distinct blinds may also be provided for the front and rear regions of the vehicle. In this case, it may be provided that the roof has a central technical portion, separating two transparent portions. The front and rear blinds are advantageously mounted in this technical portion.

Preferably, the two layers are formed of plastic, such as polycarbonate, which enables on the one hand reducing the weight of the roof, and on the other hand of integrating into it, for example by molding or casting, several complementary technical functions, enabling the manufacture and use of such a roof to be simplified and optimized.

As is seen in FIG. 1, the roof, also termed a module, is formed by two layers, a layer turned toward the exterior, termed the "design" layer 11, and a layer turned toward the vehicle interior, termed the "technical" layer 12.

According to the embodiment shown in this FIG. 1, the design layer 11, made of polycarbonate, integrates several technical functions, and particularly:

an adhesion path 111;
fixing points of joint embellishers 26;
two half-paths of cables 112 and 113 for driving the blind;
etc.

This layer may comprise a transparent zone, essentially corresponding to the central zone, and an opaque and/or colored zone intended to conceal the technical functions (and so particularly covering the elements 111, 112 and 113).

The technical layer 12, also made of polycarbonate, may itself be wholly or in large part transparent. It integrates a large number of technical functions, such as:

two half-paths of cables 121 and 122, complementary to the half-paths 112 and 113;
fixing means for a fixing ring for the trim (not shown);
fixing means 124 for a motor 13 for driving the blind;
means for receiving 125 an occulting device 14, for example a roller blind;
receiving means 125 for an occulting device 14, for example a roller blind;
module/body adhesion paths, particularly enabling application on the assembly line;
etc.

A finishing ring 15 is placed on the layer 12. A complementary technical function may be the presence of receiving and maintenance means for this finishing ring.

As will be seen below, the mounting of the roof of an embodiment of the invention is very simple. It is enough to install the different elements corresponding to the technical functions on one of the panels, then to unite the two panels. For example, the occulting device 14, the motor 13 and the driving cables connecting these two elements are fitted to the technical layer 12. Other different elements could also be fitted there, such as the finishing ring 15 and other elements which will be listed below. The two layers 11 and 12 are then assembled, for example by adhesion or snapping.

A roof glazed ready for direct mounting on a vehicle is then available, and is equipped beforehand with the various technical functions. The constructor then only has to place this roof on the chassis, without having to put in additional technical elements such as the occulting means, and therefore also not having to do the various fixations and various adjustments necessary for all the technical functions.

FIG. 2 illustrates an example, in section, of such a roof, mounted on a vehicle.

In this FIG. 2 there are distinguished the two layers 11 and 12, forming the roof, the lateral edge of which is supported on an element 21 of the chassis. Rapid and simple integration to the chassis is obtained by adhesion in the region of the elements 28. Other modes of fixing to this chassis, such as screwing, may of course be envisaged without departing from the scope of the invention.

The ring 22, which may be molded in the technical panel, retains the trim 221.

Different other technical functions will be noted on this Figure and have been integrated into one or other of the two layers, and particularly the paths of cables 24 and 25, receiving means 26 for the joint embellisher 27, and means 28 to aid assembly of the two layers, the design layer comprising a male element which becomes inserted into a corresponding housing of the technical layer (before adhesion).

In this FIG. 2 finally the space 29 is distinguished within which the occulting cloth is deployed, the curvature of this housing clearly being applied directly to the cloth. Finally, the transparent portion 114 and the opaque portion 115 of the design layer 11 will be noted.

In FIG. 3, the rear portion of the glazed roof is shown in section. It may equally concern, according to the embodiments, the forward portion, and the roller is then placed on the other side.

It is seen here that the technical layer 12 has at its end a housing 126 provided to receive the occulting means 14, here in the form of a roller blind having a cloth 31 rolled up on a tube 32.

The design layer 11 has covered this housing 126 and is slightly prolonged (116) rearward, for example on a zone provided for being supported on a chassis element.

The free end of the cloth 31 is associated with a pull bar, which enables this cloth to deploy within the mounting 34 formed between the layers 11 and 12. A technical function integrated with the panel 12 consists of providing guide means for this pull bar.

The deployment of the blind may be manual, by means of this pull bar 33, or motorized, as shown in the Figures. However, even in this latter case, means for manual deployment and rewinding may be provided, at least as means for fault clearance.

Figure 4:
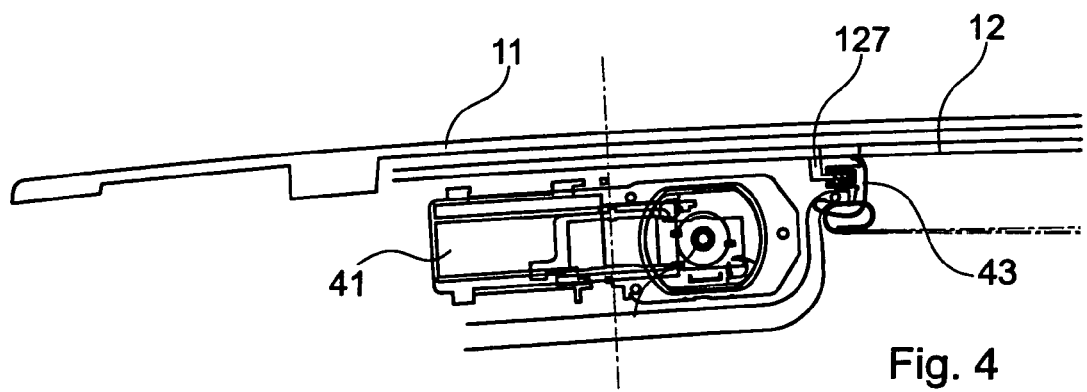
FIG. 4 shows another, motorized, embodiment of a blind on a device according to the invention.

In FIG. 4 there is shown in section the positioning of the motor 13 in a housing provided for this in the technical layer 12 and defined in particular by the elements 124 (FIG. 1).

The motor 41 is mounted on blocks of the layer 12 and housed in the trim 42, itself held by means of a fixing ring 43 which is fastened to an extension 127 provided for this purpose on the layer 12.

The drive for the blind may be of the push-pull type, using a belt or cables. As shown in FIG. 1, the roller tube may be to one side of the roof and the motor the other side.

The assembly formed by the layers 11 and 12 is preferably sealed by means of a joint and/or an adhesive ensuring the sealed state. Preferably, means for receiving this joint are provided directly on one or other of these layers, or both.

Furthermore, a system is preferably provided for ventilation and/or filtering (particularly with a dust filter) to avoid condensation. A filter of fabric or paper may particularly be concerned, defining a labyrinth. It may be mounted on the technical layer, or on the face of the device, between the two layers.

Numerous other technical functions may be integrated with the roof in the same manner, by molding or casting directly on one and/or the other of the two layers. A pre-equipped roof is thus obtained in a simple, effective, and inexpensive manner. A non-exhaustive list of these technical functions may include:

interior lighting means;
means for receiving an antenna;
antennas;
means for receiving or fixing a roof rack bar;
de-icing and/or heating means;
means to aid uniting two panels (centering and/or fixing means);
means to aid uniting the device with the vehicle;
insulating and sealing joints (between the two panels and between the device and the vehicle);
acoustic and thermal insulation means;
means for receiving and/or fixing a sealing element;
means for receiving and/or fixing filtering and/or ventilation means;
joint embellishers, or means for receiving them;
an adhesion path;
a cable path;
means for receiving and/or fixing a finishing ring;
a finishing ring;
sensors, particularly for rain, temperature and/or sunshine;
lighting means, and for example,
    means for integration of electric lighting;
    means for transmission of light through material, such as optical fiber;
    illuminating gas (neon, fluorescent, etc.)
means for insulation and/or thermal and/or acoustic control, and for example:
    thermal screen by double glazing;
    heating by passing hot air (may be connected to vehicle air conditioning);
    heat insulation by passing cold air (may be connected to vehicle air conditioning);
    gas reinforcing insulation;
occulting means, replacing or completing roller blinds, for example:
    occulting gas;
    liquid crystals;
    laminar blinds;
means for adding functions, such as fixing inserts for:
    antennas;
    center-boards
    deflectors;
    roof rack bars;
control means, for example for lighting, occultation, air conditioning, etc., for example in the form of a technical assembly, grouping controls, in the form of a series of switches or a tactile surface;
storage means, such as consoles or pockets;

windshield wiper means;
lighting;
means for receiving an interior trim of the said vehicle.
etc.

A certain number of these functions may particularly be obtained, at least partially, by molding, with the addition if necessary of portions of metal or special plastic.

Figure 5:
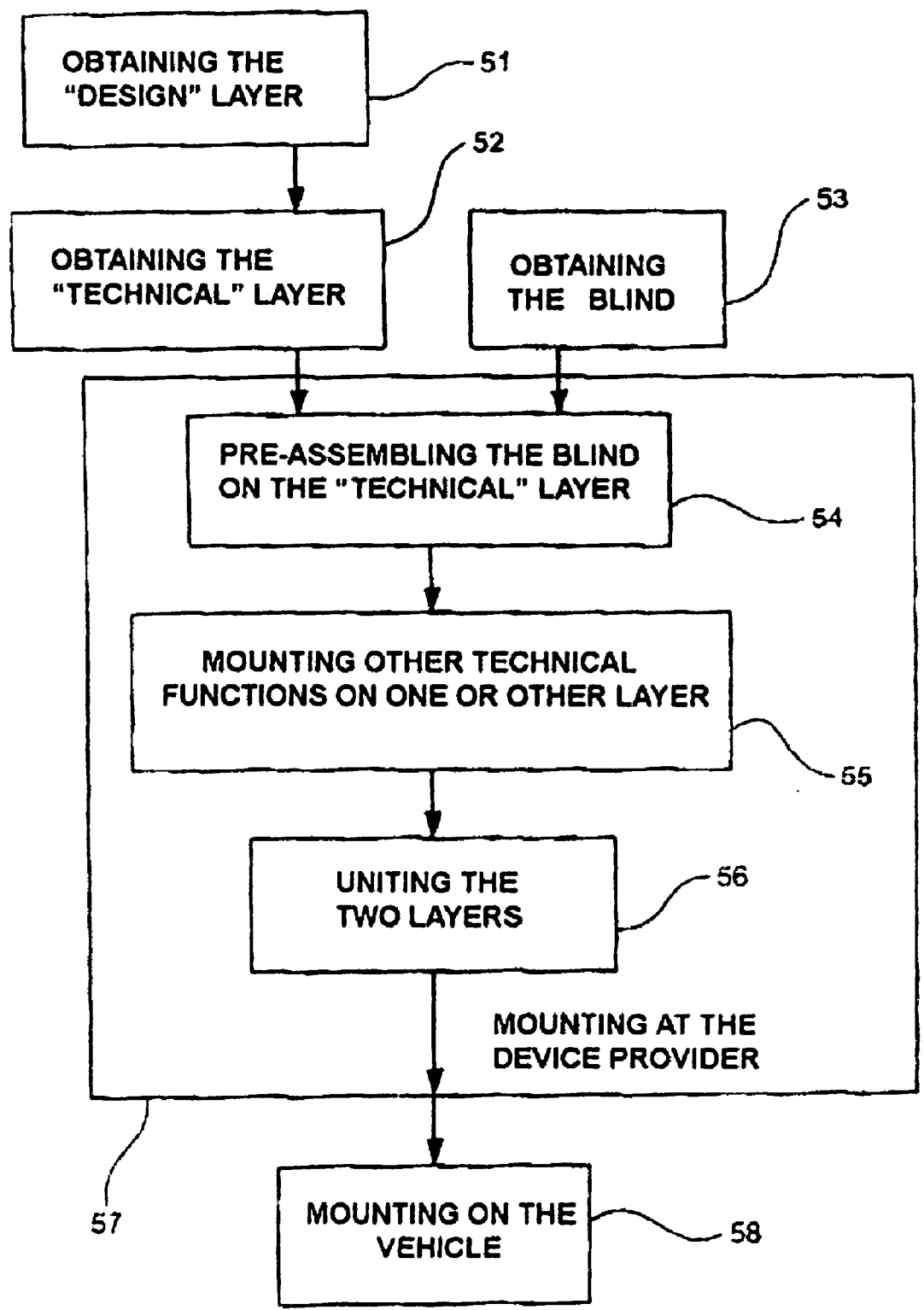
FIG. 5 is a simplified flow chart of the process of manufacture and mounting of the device according to an embodiment of the invention.

The manufacture of a roof according to an embodiment of the invention, and more generally of a vehicle window, is particularly simple, as illustrated in the diagram of FIG. 5. The two layers (51 and 52) are first obtained, by molding or casting a plastic such as for example polycarbonate (particularly of the LEXAN, MAKROLON or EXATEC type (trademarks)).

A specific treatment may be applied to the layers, to apply a protective coating there for at least one of the following aspects:
scratchproof and/or anti-impact protection;
protection against ultraviolet;
protection against ageing;
climatic protection.

The blind (53) is produced independently, and is conventional per se. In the same way, the different elements necessary for the technical functions (blind drive cable, motor, joint, etc.) will be collected.

Having all these elements available, they are first assembled on one of the layers, particularly the technical layer. In particular, the blind 14 is pre-assembled (step 54).

The mounting of the other technical functions and of the other necessary elements is also ensured (step 55).

Two pre-equipped layers are therefore available. It only remains to unite them to each other (56). This uniting may be performed by screwing, snapping, adhesion, etc.

The roof is then finished. It may be supplied to a constructor.

The mounting 57 performed at the device provider has enabled providing a completely equipped window, and it only remains for the automobile constructor to mount it on the vehicle (58). This operation is particularly simple.

It is sufficient to conventionally unite the edges of the roof to the chassis. It is no longer necessary for the constructor to then mount a blind box and then a motor to drive this blind, then the associated drive cables, then to effect the necessary adjustments. The advantages are the same for all the other technical functions already integrated into the roof.

Uniting is performed for example by screwing, adhesion, welding or other means. The joint between the two layers may be sealed by means of an encapsulated joint, an adhered joint, or a sliding joint, integral with the roof.

The manufacture and mounting are greatly simplified, particularly at the constructor, but likewise at the supplier of the device, the use of the different elements having been provided in the mold, to be directly integrated into the panels.

The technique of one or more embodiments of the invention furthermore offer numerous advantages such as in particular:
esthetic improvement, since the occulting means automatically takes on the curvature of the technical layer;
an improvement of habitability, which is not modified, there being in particular no loss of overhead height between the occulted and open positions;
a simplification of the occulting system, since it is not necessary to provide a curvature system (such as stiffeners), nor front bar (such as a pull bar), having to possess sufficient inertia to resist a suspended weight, and to offer good temperature resistance;
an effective protection of the occulting means. In fact, this is no longer within the occupants' space, but is nevertheless protected against various potential forms of deterioration (stains, burns, etc.);
improvement of resistance to impacts, the assembly formed by the two layers being more effective because of its material and its double thickness than a module conventionally formed of glass;
a reduction of weight compared with a glass roof;
a reduction of bulk and of weight of the occulting means, since provision of stiffeners is not necessary;
etc.

As already indicated, the invention is not limited to roofs, but may also be used for any inclined and/or vertical glazed zone, such as a vehicle rear window, side windows, hatchback window, windshield, etc.

Figure 6:
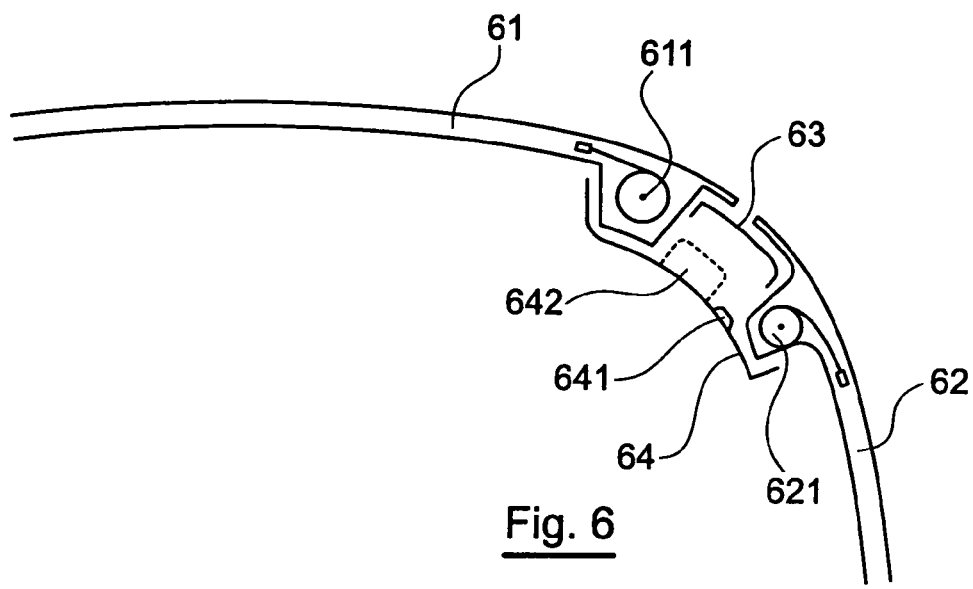
FIG. 6 shows an obturating module comprising two obturating devices according to an embodiment of the invention, assembled to one another.

Furthermore, it is possible to join several devices to form an obturation module adapted to several conventionally independent surfaces of a vehicle, such as for example the roof and the rear window. FIG. 6 shows such a module in a simplified manner.

This obturation module is then provided to simultaneously obtain a roof and a rear window, in the form of a single element, ready to be fitted to a vehicle.

It accordingly comprises a first obturation device 61 of the roof, as previously described, and a second obturation device 62 of the rear window, designed in the same way. Each of these devices accordingly comprises two parallel panels, within which occulting blinds 621 and 622 may move. It is again noted that the curvature of the corresponding device may be applied to these blinds.

These two devices 61 and 62 are united to each other by a structural crossbar 63 so as to form a monolithic assembly. This crossbar 63 will then be connected to the vehicle chassis during mounting to the vehicle, for example by welding.

An interior trim 64 is provided to conceal this crossbar 63 and more generally certain elements such as the housings of the blinds 611 and 621. This trim 64 may integrate different complementary functions, such as lighting 641, storage zones 642, etc.

All or a portion of the assembly of the roof may furthermore be fitted to this module.

Concerning the rear window module 62 (taken independently or integrated into a module), it is also provided that it has window-wiper means, lighting means (third stop light, for example), etc.

This rear window may be fixed or opening. In the latter case, it may be jointed to the crossbar 63. This mobility may of course be applied to other panels than the rear window, in various forms (tilting, sliding, etc.).

It is possible for the module to have more than two devices (certain of them may be conventional, for example in the form of a glass panel). In particular, the model of FIG. 6 may be completed by a glass windshield.

Although the present invention has been described with reference to preferred embodiments, workers skilled in the art will recognize that changes may be made in form and detail without departing from the spirit and scope of the invention.

What is claimed is:
1. An obturation device for an aperture of a vehicle, wherein the device comprises:
two transparent panels superposed and united to one another, defining an at least partially closed interior space, the panels having a matching curvature; and a movable occultation element, which can extend in the at least partially closed space between the two transparent panels, which occultation elements, when extended in the at least partially closed space, takes on a curvature corresponding to the matching curvature of the panels.

2. The obturation device according to claim 1, wherein at least one of the panels integrates at least one technical element ensuring or participating in a technical function distinct from a principal function of obturation.

3. The obturation device according to claim 2, wherein at least one of the said technical elements belongs to the group consisting of:
- means for receiving and/or fixing a sealing element;
- means for receiving or fixing filtering and/or ventilating means;
- means for receiving and/or fixing a roof rack bar, or means cooperating with a roof rack bar;
- joint embellishers;
- an adhesion path;
- a cable path;
- means for receiving and/or fixing a finishing ring;
- a finishing ring;
- means for receiving and/or fixing lighting means;
- means for receiving and/or fixing means of motorizing the occulting means;
- a sensor for rain, temperature and/or sunshine;
- means for receiving and/or fixing an antenna and/or a bodywork element;
- antennas;
- means for deicing and/or heating and/or air conditioning;
- means for receiving a gas or liquid crystals;
- means for centering and/or uniting the said panels;
- acoustic and/or thermal insulation means;
- means for centering and/or uniting the said device to the said vehicle;
- means for sealing between the said device and the said vehicle;
- means for control and command of elements integrated with the said device;
- windshield-wiper means;
- illuminating lights; and
- means for receiving an interior trim of the said vehicle.

4. The obturation device according to claim 1, wherein the device has at least one of an encapsulated joint, an adhesive joint, and a sliding joint.

5. The obturation device according to claim 1, wherein the panels each define a half shell, obtained by molding, casting, thermoforming or extrusion.

6. The obturation device according to claim 5, wherein at least one of the panels integrates at least one technical element ensuring or participating in a technical function distinct from a principal function of obturation and the technical element is obtained simultaneously with the corresponding panel, by molding, casting, thermoforming or extrusion, such that each panel forms a single portion, integrating the technical element.

7. The obturation device according to claim 2, wherein at least one of the panels has at least one opaque or colored zone, intended to conceal one or more of the technical elements.

8. The obturation device according to claim 2, wherein the device comprises an external panel and an internal panel, the technical elements being principally associated with the internal panel.

9. The obturation device according to claim 8, wherein at least one opaque and/or colored zone is formed on the external panel.

10. The obturation device according to claim 1, wherein the panels are made of plastic.

11. The obturation device according to claim 10, wherein at least one of the panels has a coating providing at least one of the protections belonging to the group comprising: scratchproof and anti-impact protection; protection against ultraviolet radiation; protection against aging; and climatic protection.

12. The obturation device according to claim 1, wherein the device is intended for at least one of the elements belonging to the group consisting of: roofs; rear windows; side windows; windshields; and hatchbacks.

13. The obturation device according to claim 1, wherein the device comprises means permitting a displacement with respect to a chassis of the vehicle.

14. The obturation device according to claim 13, wherein the means permitting displacement comprises at least one hinge.

15. An obturation module for a vehicle, wherein the module comprises at least two obturation devices according to claim 1, joined to one another by at least one structural element.

16. The obturation module according to claim 15, wherein at least one of the structural elements comprises means for joining to a chassis of the vehicle.

17. The obturation module according to claim 15, wherein a first of the obturation devices is adapted for installation into a roof of the vehicle and a second of the obturation devices is adapted for installation into a rear window of the vehicle.

18. The obturation module according to claim 15, wherein each of the obturation devices comprises occulting means.

19. The obturation module according to claim 15, wherein the module comprises a windshield.

20. The obturation module according to claim 15, wherein the module comprises an internal trim, at least partially covering a junction zone between the obturation devices.

21. The obturation module according to claim 20, wherein the trim covers housings of two occulting blinds, respectively associated with two of the obturation devices.

22. The obturation module according to claim 20, wherein the internal trim integrates at least one supplementary function.

23. The obturation module according to claim 22, wherein the at least one supplementary function belongs to the group consisting of: interior lighting; and one or more storage units.

24. An automobile vehicle comprising:
a vehicle having an aperture formed in the vehicle; and
at least one obturating device or module in the aperture, wherein the obturating device comprises:
   two panels superposed and united to one another, defining an internal at least partially closed space, the panels having a matching curvature; and
   a movable occulting element, which is movable in the at least partially closed space between the two panels, which occultation element, when extending in the at least partially dosed space, takes on a curvature corresponding to the matching curvature of the panels.

* * * * *